United States Patent [19]

Mori

[11] Patent Number: 5,377,021
[45] Date of Patent: Dec. 27, 1994

[54] TELEMATIC TERMINAL WHICH PRODUCES AND EDITS MIXED MODE DOCUMENT

[75] Inventor: Yukikazu Mori, Ebina, Japan

[73] Assignee: Ricoh Company, Ltd., Tokyo, Japan

[21] Appl. No.: 804,721

[22] Filed: Dec. 11, 1991

[30] Foreign Application Priority Data

Dec. 13, 1990 [JP] Japan .................. 2-410153

[51] Int. Cl.⁵ .......................................... H04N 1/415
[52] U.S. Cl. .................................. 358/462; 358/468; 358/434
[58] Field of Search ............... 358/462, 442, 468, 434, 358/438, 439, 450, 453, 403, 538; 379/100; H04N 1/415

[56] References Cited

U.S. PATENT DOCUMENTS

| | | | |
|---|---|---|---|
| 4,672,459 | 6/1987 | Kudo ................................ | 358/462 |
| 4,827,349 | 5/1989 | Ogata et al. ..................... | 358/434 |
| 4,922,349 | 5/1990 | Abe et al. ........................ | 358/538 |
| 5,041,918 | 8/1991 | Ishida et al. .................... | 358/450 |

FOREIGN PATENT DOCUMENTS 256172  2/1990  Japan .

*Primary Examiner*—Curtis Kuntz
*Assistant Examiner*—Jill Jackson
*Attorney, Agent, or Firm*—Oblon, Spivak, McClelland, Maier & Neustadt

[57] ABSTRACT

A telematic terminal generally used for a group 4 facsimile apparatus which produces a mixed mode document and transmits to another communication apparatus. The mixed mode document is divided into a plurality of blocks and each block of mixed mode document is judged to be constructed with a normal format or abnormal format. Since the block constructed with the abnormal format is indicated on a screen of a display unit of the telematic terminal and what kind of abnormal format the other communication apparatus can manage is transmitted, the operator can easily learn whether or not the mixed mode document can be properly transmitted to the other communication apparatus. If necessary, the operator can edit the block so that the other communication apparatus can receive the mixed mode document.

8 Claims, 4 Drawing Sheets

| | NORMAL VALUE | ABNORMAL VALUE |
|---|---|---|
| CHARACTER INTERVAL (NUMBER OF LETTERS/INCH) | 10 | 6,12,15 |
| LINE INTERVAL (NUMBER OF LINES/INCH) | 3,4,6,12 | 8 |
| RESOLUTION (NUMBER OF PIXELS/INCH) | 240,300 | 200,400,600,1200 |

TELEMATIC TERMINAL WHICH PRODUCES AND EDITS MIXED MODE DOCUMENT

BACKGROUND OF THE INVENTION

The present invention relates generally to a telematic terminal which produces and edits a mixed mode document transmitted by the telematic terminal.

Comité Consultatif International Télégraphique et Téléphonique (abbreviated CCITT hereinafter) gives standards for telematic services, used for a group 4 (G4) facsimile apparatus (abbreviated FAX hereinafter), teletex, and videotex, and provides various definitions about them. A mixed mode document is one of the telematic services, on the same page of which characters (and also letters) and figures are mixedly arranged but individually transmitted to a receiver terminal. Generally, the characters are converted into and transmitted as code data, and the figures are converted into and transmitted as raster data. Each page of a mixed mode document is divided into a plurality of blocks, in which the characters and figures are separately allotted, a block used for characters being called a text block, and a block used for figures being called a raster block. It is necessary to define the text block and/or the raster block before arranging the characters or the figures with a predetermined format, on a desired block.

The CCITT outlines a protocol of the mixed mode in T.501 in which values defining format are predetermined for characters and figures. That is, each of the characters and figures can be arranged in either a normal format or an abnormal format. The normal format is a mandatory format for each telematic terminal, so that the receiver terminal can always accept a mixed mode document, arranged in the normal format, received from a transmitter terminal. However, the abnormal format is optional for each telematic terminal, so that the receiver terminal can accept a character arranged in the abnormal format only when the receiver terminal is equipped with the value of the abnormal format. In this case, the characters arranged in the abnormal format can be converted into the raster data, and then transmitted to the receiver, as disclosed in Japanese Laid-Open Patent Application No. 2-56172. Incidentally, raster data of abnormal format can be converted into the normal format by the receiver terminal.

The letter interval of characters has a value in normal format of 10 letters/inch and values in abnormal format of 6, 12, and 15 letters/inch. The line interval of the characters has values in normal format of 3, 4, 6 and 12 lines/inch and a value in abnormal format of 8 lines/inch. The resolution of the raster data has values in normal format of 240 and 300 picture elements (pixels)-/inch, and values in abnormal format of 200, 400, 600 and 1200 pixels/inch.

However, the conventional telematic terminal has the following disadvantages:

1. The receiver terminal cannot freely edit characters transmitted as raster data, whereas the receiver terminal can freely edit characters transmitted as code data; and 2. The communication time is long since the amount of raster data is more than that of code data;

3. When raster data is converted from abnormal format into normal format, it often exhibits deterioration; for example, the resolution with the abnormal value 400 ppi (pel per inch) is converted that with the normal value 300 ppi.

4. It is difficult for an operator of the transmitter terminal to judge which part of the mixed mode document is not receivable by the receiver terminal.

SUMMARY OF THE INVENTION

Accordingly, it is a general object of the present invention to provide a novel and useful mixed mode document editor in which the above disadvantages are eliminated.

Another and more specific object of the present invention is to provide a mixed mode document editor which clarifies which part of the mixed mode document is not receivable by the receiver terminal.

According to one feature of the present invention, a communication apparatus comprises document producing means for editing and producing a mixed mode document in which characters and figures are mixed on a same page thereof, the characters and/or figures being arranged in either a normal format or an abnormal format, a first element defining the normal format being attached to the communication apparatus, so that the communication apparatus can accept characters transmitted thereto which are arranged in the normal format, but a second element defining the abnormal format being attached, optionally, to the communication apparatus, so that the communication apparatus can accept characters transmitted thereto which are arranged in the abnormal format only when the second element is attached to the communication apparatus, judging means, coupled to the document producing means, for judging whether or not the mixed mode document produced by the document producing means includes the abnormal format, and communicating means, coupled to the document producing means and judging means, for communicating with another communication apparatus, the communicating means transmitting the mixed mode document, as it is, to the other communication apparatus if the judging means has judged that the mixed mode document does not have the abnormal format, and the communicating means transmitting the mixed mode document after the document producing means has edited the mixed mode document so that the other communication terminal can accept the mixed mode document if the judging means has judged that the mixed mode document has the abnormal format.

According to the present invention, because of the judging means, an operator of the communication apparatus can easily and quickly recognize whether or not the mixed mode document has the abnormal format. Therefore the operator can, if necessary, edit the mixed mode document before transmitting it to the other communication apparatus.

Other objects and further features of the present invention will become apparent from the detailed description when read in conjunction with the accompanying drawings.

DETAILED DESCRIPTION OF THE PREFERRED EMBODIMENTS

Figure 1:
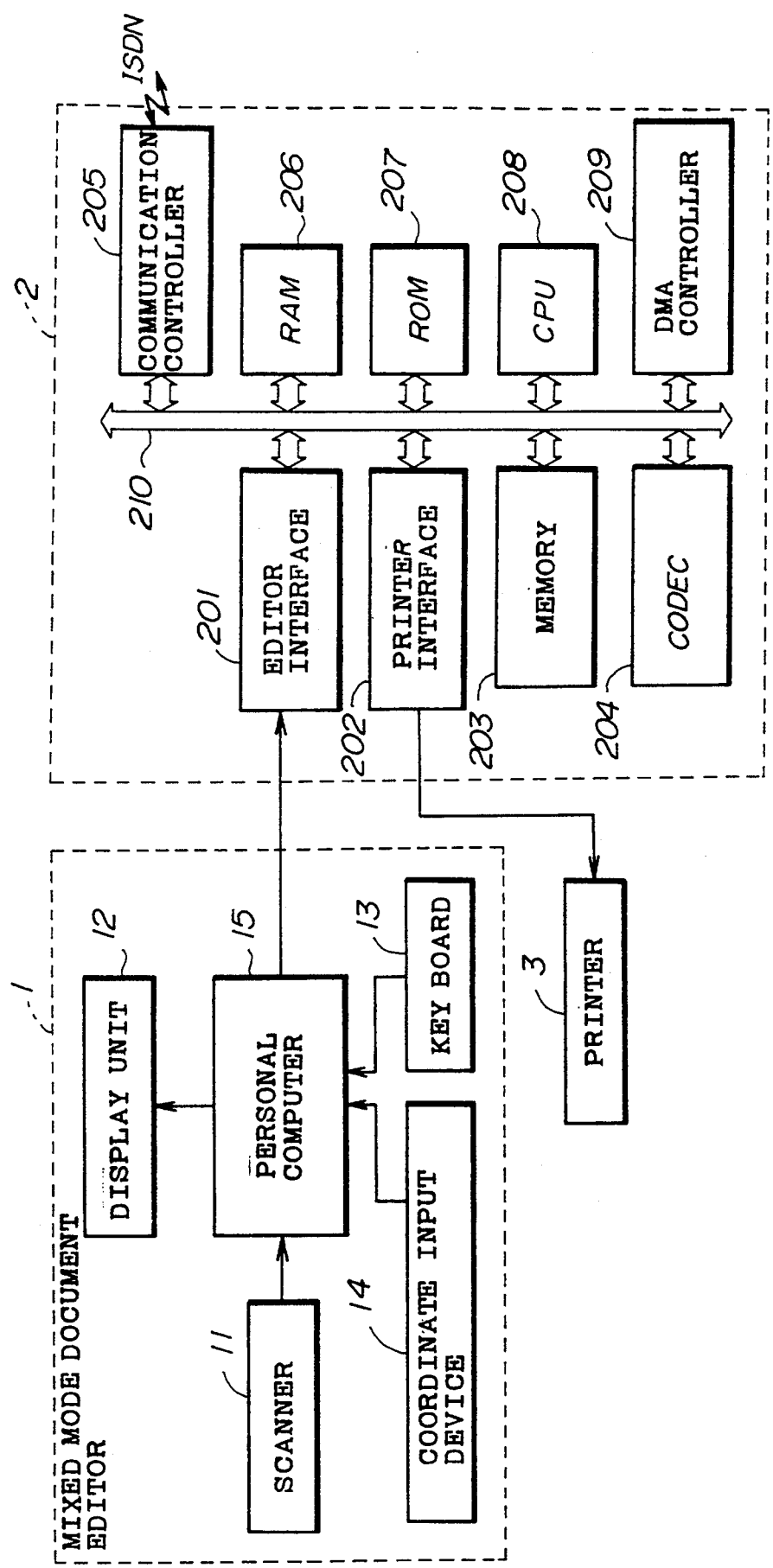
FIG. 1 shows a block diagram of a mixed mode document communication system according to the present invention.

A mixed mode document communication system according to the present invention comprises, as shown in FIG. 1, a mixed mode document editor 1 and a mixed mode communication apparatus 2.

The mixed mode document editor 1 produces a mixed mode document desired by an operator of the mixed mode document communication system. The mixed mode document editor 1 comprises a scanner 11, display unit 12, keyboard 13, coordinate input device 14 and personal computer 15. The scanner 11 reads out images on a document. The display unit 12 indicates an edited image or an operating state on a screen. The operator inputs characters via a keyboard 13. The operator designates a point on a coordinate on the screen via the coordinate input device 14, which may be comprised of a mouse. The personal computer 15 processes an image for the document edition.

The mixed mode communication apparatus 2 transmits and receives a mixed mode document via the ISDN network. The mixed mode communication apparatus 2 comprises an editor interface 201, printer interface 202, memory 203, CODEC (Coder and Decoder) 204, communication controller 205, RAM (Random Access Memory) 206, ROM (Read Only Memory) 207, CPU (Central Processing Unit) 208, and DMA (Direct Memory Access) controller 209. The editor interface 201 receives produced document data and various instruction data from the mixed mode document editor 1. The printer interface 202 outputs data to be plotted to an external printer. The memory 203 temporarily stores document data, and may be comprised of a hard disk storage. The CODEC 204 encodes and/or decodes data. The communication controller 205, connected to the ISDN network, executes predetermined protocols for the ISDN network. The RAM 206 temporarily stores various data. The ROM 207 stores control programs used for the CPU 208 and other various data. The CPU 208 controls operation of each part of the mixed mode communication apparatus 2. The DMA controller 209 performs data transmission among each part of the mixed mode communication apparatus 2 without supervision of the CPU 208. The system bus 210 is a signal line via which each part of the mixed mode communication apparatus 2 communicates with each other.

Figure 2:
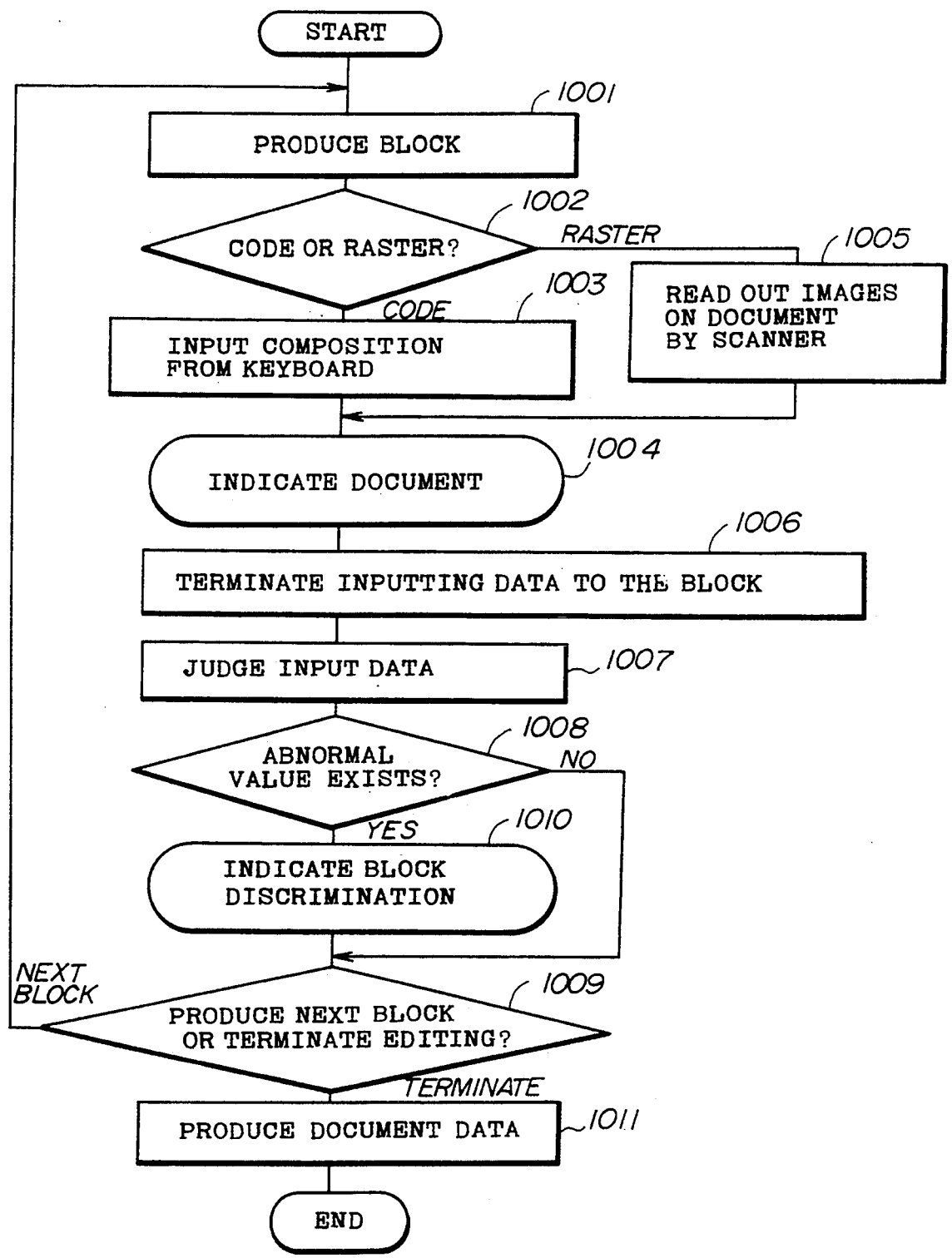
FIG. 2 shows a flowchart executed by a mixed mode document editor shown in FIG. 1.
Figures 3, 4:
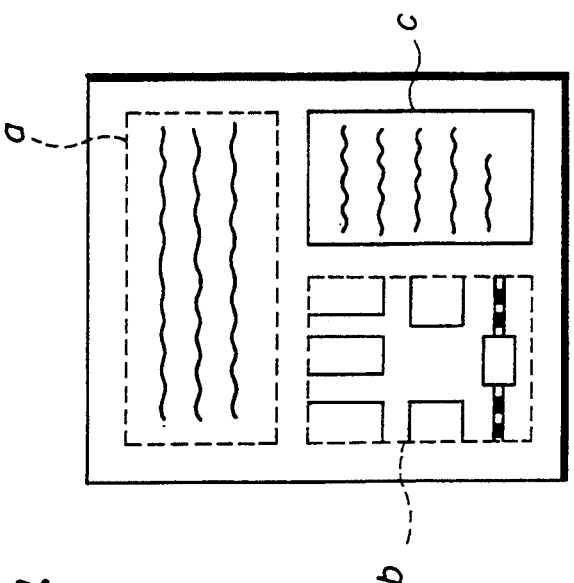
FIG. 3 shows a sample table of normal values and abnormal values of code data and raster data.
FIG. 4 shows an indicated screen of the mixed mode document editor shown in FIG. 1.

A description will now be given of how the operator produces a desired document with the mixed mode document editor 1. As shown in FIG. 2, the operator forms a block with an arbitrary scale and at an arbitrary position in the document by designating the corresponding coordinates on the screen of the display unit 12 via the coordinate input device 14 (in step 1001). Simultaneously, the operator determines whether the block is used for the code data or the raster data (in step 1002). If the code data is to be written on the block, the operator inputs a desired composition via the keyboard 13. Incidentally, the protocols of the mixed mode document are defined in T.410 and T.501 given by the CCITT. T.501 defines various normal values and abnormal values, and FIG. 3 shows a sample table of the normal values and abnormal values of a character interval, line interval and resolution.

In this embodiment, when a composition is input, the character interval and line interval thereof can be adjusted. In addition, letter attributes, such as an underscore or a thick line, can be adjusted.

The operator inputs a desired composition to the personal computer 15 (in step 1003). The personal computer then writes down the input composition on the designated block, and indicates the result on the screen of the display unit 12 (in step 1004). Alternatively, if raster data is to be written on the block, the operator sets a document on the scanner 11. The resolution of the scanner for reading the document is adjustable. Thus, the scanner 11 reads out the document (in step 1005) and the result is indicated on the screen of the display unit (in step 1004). The operator then terminates input of data to the block (in step 1006).

The personal computer 15 judges whether or not an abnormal value has been established (in steps 1007 and 1008). If there is no abnormal value, the operator can produce another block or terminate editing (in step 1009). Thus, blocks are sequentially produced and indicated on the screen of the display unit 12, as shown in "a" and "b" in FIG. 4. If an abnormal value has been detected in step 1008, it is indicated on the screen, for example by emphasizing the block frame, as shown in "c" in FIG. 4 (in step 1010). Thus, the operator can learn of the existence of the abnormal value. In this case, the operator checks the function of the receiver terminal, and if the receiver terminal seems to be unable to receive the document with the abnormal value, the operator reedits the document.

Figure 5:
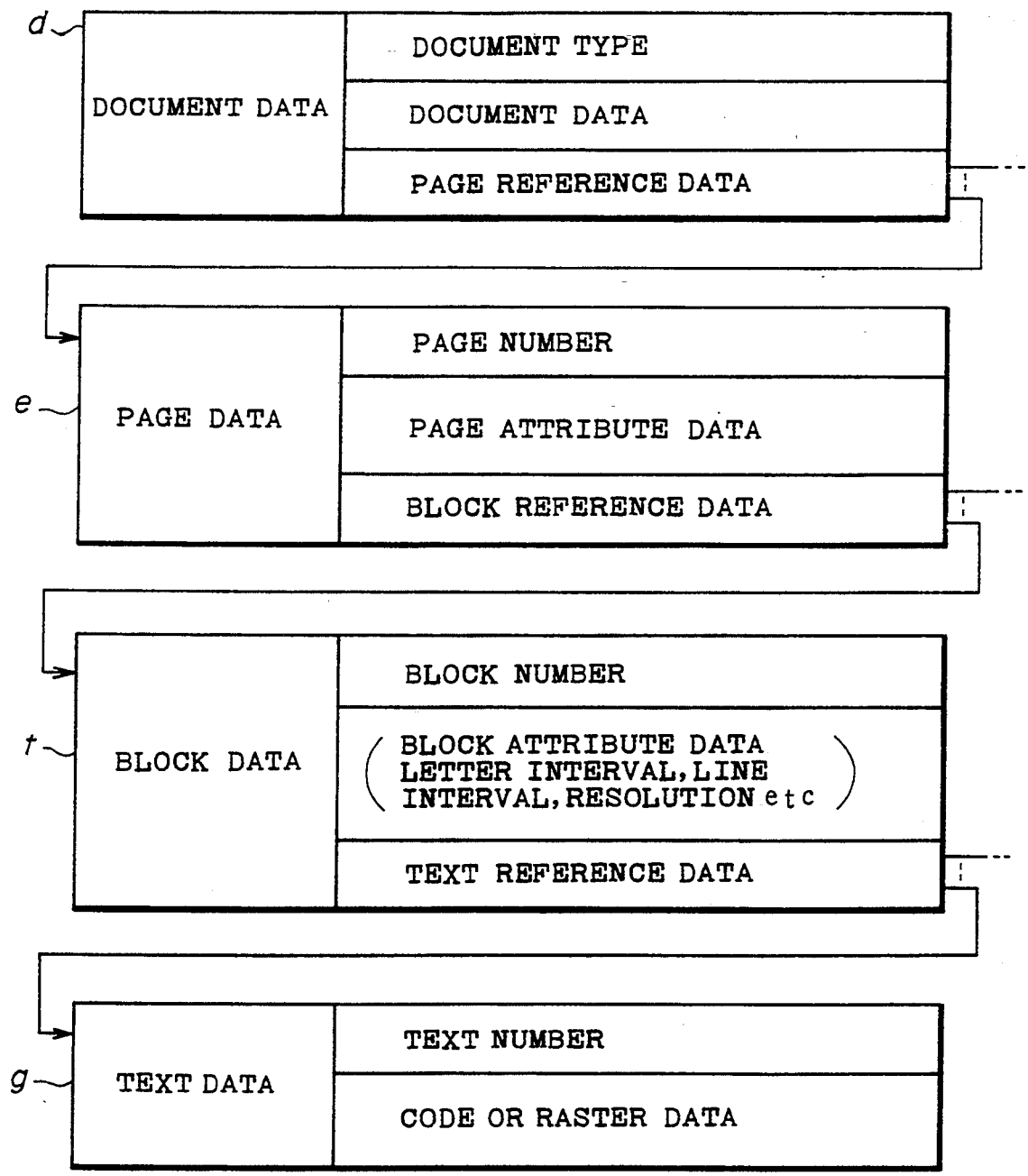
FIG. 5 shows a construction of document data.

FIG. 5 shows a construction of document data. The document data "d" comprises a document type, document data and page reference data. The document data represents that the document belongs to the mixed mode document. The document data represents a document construction, such as a page and block. The page reference data represents a position in the memory which stores page data "e". The page data "e" representing the contents of each page, comprises a page number, page attribute data, and block reference data. The page attribute data indicates a page size, for example. The block reference data indicates a stored position of block data "f". The block data "f", representing the contents of each block, comprises a block number, block attribute data, and text reference data. The block attribute data indicates the position and size of each block, whether the data is code data or raster data, letter and line intervals of the code data, and a line density of the raster data. The text reference data indicates a stored position of text data "g" in the memory. The text data "g" comprises a text number, and code or raster data.

The operator operates a predetermined transmission protocol via the keyboard 13, so that the mixed mode document editor 1 transmits the produced document data and necessary information to the mixed mode communication apparatus 2. The mixed mode communication apparatus 2 temporarily stores the transmitted document data memory 203, and simultaneously transmits an outgoing call to the received terminal.

When the received terminal accepts the outgoing call, the mixed mode communication apparatus 2 executes predetermined transmission control procedures. The mixed mode communication apparatus 2 transmits an image process capability of the transmitter terminal to the receiver terminal by a CD (Capability Data) command. On the other hand, the receiver terminal transmits an image process capability of the receiver terminal to the transmitter terminal by the CDA (Capability Data ACK) command. Thus, the mixed mode communication apparatus can detect the type of data the receiver terminal can manage.

The mixed mode communication apparatus 2 reads out a transmitted document from the memory 203. If the transmitted document includes a block with an abnormal value and the receiver terminal can manage the abnormal value, characters are transmitted as code data and a figure data is transmitted as raster data to the receiver terminal. If, on the contrary, the receiver terminal cannot manage the abnormal value, the character corresponding to the abnormal value is converted into raster data and then transmitted to the receiver terminal. Further, if the receiver terminal cannot manage the abnormal value, the figure corresponding to the abnormal value is converted into raster data having a normal value and then transmitted to the receiver terminal.

Thus, according to the present invention, if the operator produces one block of code data or raster data, the personal computer 15 detects whether or not there exists an abnormal format and indicates its finding on the screen of the display unit 12. Therefore, the operator can easily acknowledge the existence and position of an abnormal value in the mixed mode document. Incidentally, a letter message or an alarm sound may warn of the detected block with abnormal value indicated on the screen.

Further, the present invention is not limited to these preferred embodiments, and various variations and modifications may be made without departing from the scope of the present invention.

What is claimed is:

1. A communication apparatus comprising:
   document producing means for editing and producing a mixed mode document in which characters and figures are mixed on a page thereof, the characters and figures being arranged in either a normal format or an abnormal format, a first element defining the normal format being attached to said communication apparatus, so that said communication apparatus can accept characters and figures transmitted thereto which are arranged in the normal format, but a second element defining the abnormal format being attached, optionally, to said communication apparatus, so that said communication apparatus can accept characters and figures transmitted thereto, which are arranged in the abnormal format, only when the second element is attached to said communication apparatus;
   judging means, coupled to said document producing means, for judging if the mixed mode document produced by said document producing means includes the abnormal format and for judging if another communication apparatus can accept a document in the abnormal format;
   indicating means, connected to the judging means, for indicating a part of the mixed mode document includes the abnormal format when the document has been judged to include the abnormal format; and
   communicating means, coupled to said document producing means, said judging means, and said indicating means, for communicating with the other communication apparatus, said communicating means transmitting the mixed mode document, in an existing form, to the other communication apparatus if said judging means has judged that the mixed mode document does not have the abnormal format, said communication means transmitting the mixed mode document in an existing form to the other communication apparatus if said judging means has judged that the mixed mode document has the abnormal format and has judged that the other communication apparatus can accept a document in the abnormal format, and said communicating means transmitting the mixed mode document after said editing by said document producing means has edited the mixed mode document so that the other communication terminal can accept the mixed mode document if said judging means has judged that the mixed mode document has the abnormal format.

2. A communication apparatus according to claim 1, wherein said communicating means exchanges information concerning the second element with the other communication apparatus, and said communicating means transmitting the mixed mode document in an existing form to the other communication apparatus if the second element of said communication apparatus is identical to a second element of the other communication apparatus.

3. A communication apparatus according to claim 1, wherein each page of said mixed mode document is divided into a plurality of blocks, and said judging means judges each of said plurality of blocks of said mixed mode document.

4. A communication apparatus according to claim 1;
   wherein said judging means is also for judging if the other communication apparatus has a second element defining the abnormal format of characters; and
   wherein if the other communication apparatus is judged, by said judging means, to have said second element defining the abnormal format of characters, said communicating means transmits to the other communication apparatus, using the abnormal format, the characters as code data and the figures as raster data, and
   wherein, if the other communication apparatus is judged, by said judging means, not to have said second element defining the abnormal format of characters, said document producing means converts the abnormal format of characters into raster data and then the communicating means transmits, using the normal format, the mixed mode document to the other communication apparatus.

5. A communication apparatus according to claim 1;
   wherein said judging means is also for judging if the other communication apparatus has a second element defining the abnormal format of figures; and
   wherein if the other communication apparatus is judged, by said judging means, to have said second element defining the abnormal format of figures, said communicating means transmits, using the abnormal format, to the other communication apparatus the characters as code data and the figures as raster data, and
   wherein, if the other communication apparatus is judged, by said judging means, not to have said second element defining the abnormal format of figures, said document producing means converts the abnormal format of figures into the normal format of figures and then the communicating means transmits, using the normal format, the mixed mode document to the other communication apparatus.

6. A communication apparatus according to claim 1, wherein said communicating means communicates with the other communication apparatus via an Integrated Service Digital Network (ISDN).

7. A communication apparatus according to claim 1 comprising a telematic terminal.

8. A communication apparatus according to claim 7 belonging to a third class of group 4 facsimile apparatuses.

* * * * *